United States Patent
Parmer

(10) Patent No.: US 11,999,656 B2
(45) Date of Patent: Jun. 4, 2024

(54) ENVIRONMENTALLY FRIENDLY CONCRETE COMPOSITION OF MATTER AND METHOD OF FORMING THE SAME

(71) Applicant: Andrew J Parmer, Auburn, AL (US)

(72) Inventor: Andrew J Parmer, Auburn, AL (US)

( * ) Notice: Subject to any disclaimer, the term of this patent is extended or adjusted under 35 U.S.C. 154(b) by 0 days.

(21) Appl. No.: 17/865,149

(22) Filed: Jul. 14, 2022

(65) Prior Publication Data

US 2023/0012483 A1   Jan. 19, 2023

Related U.S. Application Data

(60) Provisional application No. 63/221,836, filed on Jul. 14, 2021.

(51) Int. Cl.

| C04B 14/06 | (2006.01) |
|---|---|
| C04B 14/42 | (2006.01) |
| C04B 18/02 | (2006.01) |
| C04B 18/12 | (2006.01) |
| C04B 18/16 | (2023.01) |
| C04B 18/167 | (2023.01) |
| C04B 28/00 | (2006.01) |
| C04B 28/04 | (2006.01) |
| C04B 28/28 | (2006.01) |
| C04B 111/00 | (2006.01) |

(52) U.S. Cl.
CPC ............ *C04B 18/167* (2013.01); *C04B 14/06* (2013.01); *C04B 14/42* (2013.01); *C04B 18/022* (2013.01); *C04B 18/12* (2013.01); *C04B 28/003* (2013.01); *C04B 28/04* (2013.01); *C04B 28/28* (2013.01); *C04B 2111/00017* (2013.01); *Y02W 30/91* (2015.05)

(58) Field of Classification Search
CPC ....... C04B 18/167; C04B 14/06; C04B 14/42; C04B 18/022; C04B 18/12; C04B 28/003; C04B 28/04; C04B 28/28; C04B 2111/00017; C04B 18/02; C04B 18/04; C04B 18/16; C04B 28/00; Y02W 30/91
See application file for complete search history.

(56) References Cited

FOREIGN PATENT DOCUMENTS

CN   110981344 A  *  4/2020

OTHER PUBLICATIONS

CN-110981344-A, machine translation (Year: 2020).*

* cited by examiner

*Primary Examiner* — Kevin E Yoon
*Assistant Examiner* — Marites A Guino-O Uzzle
(74) *Attorney, Agent, or Firm* — CHRISTOPHER R. GANTER, LLC

(57) ABSTRACT

An environmentally friendly composition of matter comprising a limestone and fiberglass based waste material used to substitute out a portion of natural aggregate with said waste material so as to preserve natural resources, protect the environment and prevent depletion of landfill capacity and reuse unusable waste products into environmentally useful products.

14 Claims, 3 Drawing Sheets

| Calculations by Weight | Normal | 10% Waste | 25% Waste | 50% Waste | 60% Waste | 75% Waste | 100% Fine Waste | 100% Coarse Waste |
|---|---|---|---|---|---|---|---|---|
| Cement (kg) | 411.055 | 411.055 | 411.055 | 411.055 | 411.055 | 411.055 | 411.055 | 411.055 |
| Fine Aggregate (kg) | 616.582 | 554.924 | 462.436 | 308.291 | 246.633 | 154.145 | 0.000 | 616.582 |
| Coarse Aggregate (kg) | 1233.164 | 1109.847 | 924.873 | 616.582 | 493.265 | 308.291 | 1233.164 | 0.000 |
| Waste Fine Aggregate (kg) | 0.000 | 61.658 | 154.145 | 308.291 | 369.949 | 462.436 | 616.582 | 0.000 |
| Waste Coarse Agg. (kg) | 0.000 | 123.316 | 308.291 | 616.582 | 739.898 | 924.873 | 0.000 | 1233.164 |

FIG. 1

| Materials | (kg) | % of Mix |
|---|---|---|
| Ordinary Portland Cement | 15.80 | 15.55% |
| Waste Material up to 1 ¾" | 42.01 | 41.34% |
| Fine Aggregate (Sand) | 35.47 | 34.9% |
| Water | 8.34 | 8.2% |
| | | |

FIG. 2

| Materials | (kg) | % of Mix |
|---|---|---|
| Ordinary Portland Cement | 15.80 | 15.55% |
| Waste Material ground powder | 42.01 | 41.34% |
| Coarse Aggregate | 35.47 | 34.9% |
| Water | 8.34 | 8.2% |
| | | |

FIG. 3

| Materials | (kg) | % of Mix |
|---|---|---|
| Ordinary Portland Cement | 15.80 | 15.55% |
| Waste Material ground powder | 42.01 | 41.34% |
| Fine Aggregate (Sand) | 35.47 | 34.9% |
| Water | 8.34 | 8.2% |
| | | |

FIG. 5

| Calculations by Weight | Normal | 10% Waste | 25% Waste | 50% Waste | 60% Waste | 75% Waste | 100% Fine Waste | 100% Coarse Waste |
|---|---|---|---|---|---|---|---|---|
| Cement (kg) | 411.055 | 411.055 | 411.055 | 411.055 | 411.055 | 411.055 | 411.055 | 411.055 |
| Fine Aggregate (kg) | 616.582 | 554.924 | 462.436 | 308.291 | 246.633 | 154.145 | 0.000 | 616.582 |
| Coarse Aggregate (kg) | 1233.164 | 1109.847 | 924.873 | 616.582 | 493.265 | 308.291 | 1233.164 | 0.000 |
| Waste Fine Aggregate (kg) | 0.000 | 61.658 | 154.145 | 308.291 | 369.949 | 462.436 | 616.582 | 0.000 |
| Waste Coarse Agg. (kg) | 0.000 | 123.316 | 308.291 | 616.582 | 739.898 | 924.873 | 0.000 | 1233.164 |

FIG. 6

| Design Mix 1 | Ratios | Percentages (by weight Kg) |
|---|---|---|
| Cement | 1 | 17.76% |
| Coarse Aggregate | 2.908 | 51.64% |
| Fine Aggregate | 1.324 | 23.50% |
| Water | 0.4 | 7.10% |

FIG. 7

| Design Mix 2 | Ratios | Percentages (by weight Kg) |
|---|---|---|
| Cement | 1 | 14.27% |
| Coarse Aggregate | 3.784 | 54.01 |
| Fine Aggregate | 1.722 | 24.58% |
| Water | 0.5 | 7.14% |

FIG. 8

| Design Mix 3 | Ratios | Percentages (by weight Kg) |
|---|---|---|
| Cement | 1 | 11.93% |
| Coarse Aggregate | 4.659 | 55.60% |
| Fine Aggregate | 2.121 | 25.31% |
| Water | 0.6 | 7.16% |

ENVIRONMENTALLY FRIENDLY CONCRETE COMPOSITION OF MATTER AND METHOD OF FORMING THE SAME

CROSS-REFERENCED TO RELATED APPLICATIONS

This application claims the benefit of priority to Provisional Application No. 63/221,836 filed on Jul. 14, 2021.

FEDERALLY SPONSORED RESEARCH

None

SEQUENCE LISTING

None

FIELD OF THE INVENTION

The present invention relates to a concrete mixture and method of forming the same that utilizes scrap materials from particular industries.

BACKGROUND OF THE INVENTION

The home and bathroom fixture industry generates various showers, shower panels, bathtubs, sinks, sink counters and other bathroom and kitchen fixtures that uses a primarily limestone ($CaCO_3$) and fiberglass based mixture that is formed into various molds and subjected to high pressure and heat to form the various aforesaid bathroom fixture items. However, as in all processes, the manufacturing process is not one hundred percent perfect and there occur defects and discards in the said various bathroom fixtures whereby they are malformed, fractured or splintered bathroom fixtures that are not suitable to be sold or used in the marketplace. Because there is no suitable marketable use for these defective fixtures, they must be sent to landfills as waste material that can occupy large amounts of landfill space which is a hazard to the environment. Further, people are constantly replacing bathroom fixtures with updated and newer bathroom fixtures thereby creating a constant stream of waste material that will only be hauled to a landfill further necessitating bigger and future landfills which are unsightly for people living near them, a hazard to the environment and an unfortunate use to land that could have been used for other purposes. What is needed in the art is a method and use of this defective scrap material to be fashioned into marketable, usable and functioning products that could be used in various useful applications. Because concrete uses primarily limestone or other rock as its base, this waste material can be used to fashion a concrete composition that can be used to form a variety of products. Because the waste material becomes a major component by weight of these new concrete products, it is therefore recycled. The use of this waste material allows it to effectively be recycled and reduces the need for the mining of limestone from quarries which create water, air, and noise pollution among others which adversely affect the environment.

SUMMARY OF THE INVENTION

Disclosed is the use of defective waste material comprising a certain percentage of limestone, fiberglass, titanium dioxide, calcium stearate, magnesium hydroxide, polyethylene and quartz. The defective waste material is then mixed at a certain percentage with ordinary Portland cement, a natural aggregate and water and pouring said mixture into various molds to create useful products.

BRIEF DESCRIPTION OF THE DRAWINGS

FIG. 1 is a chart showing a formulation of the concrete composition.

FIG. 2 is a chart showing an alternate embodiment of the concrete composition.

FIG. 3 is a chart showing an alternate embodiment of the concrete composition.

FIG. 5 is a table showing various percentages of natural coarse and fine aggregate and various percentages of waste material coarse and fine aggregate used to form a concrete composition.

FIG. 6 is a table showing an alternative embodiment of the concrete composition.

FIG. 7 is a table showing an alternative embodiment of the concrete composition.

FIG. 8 is a table showing an alternative embodiment of the concrete composition.

DETAILED DESCRIPTION

Figure 4:
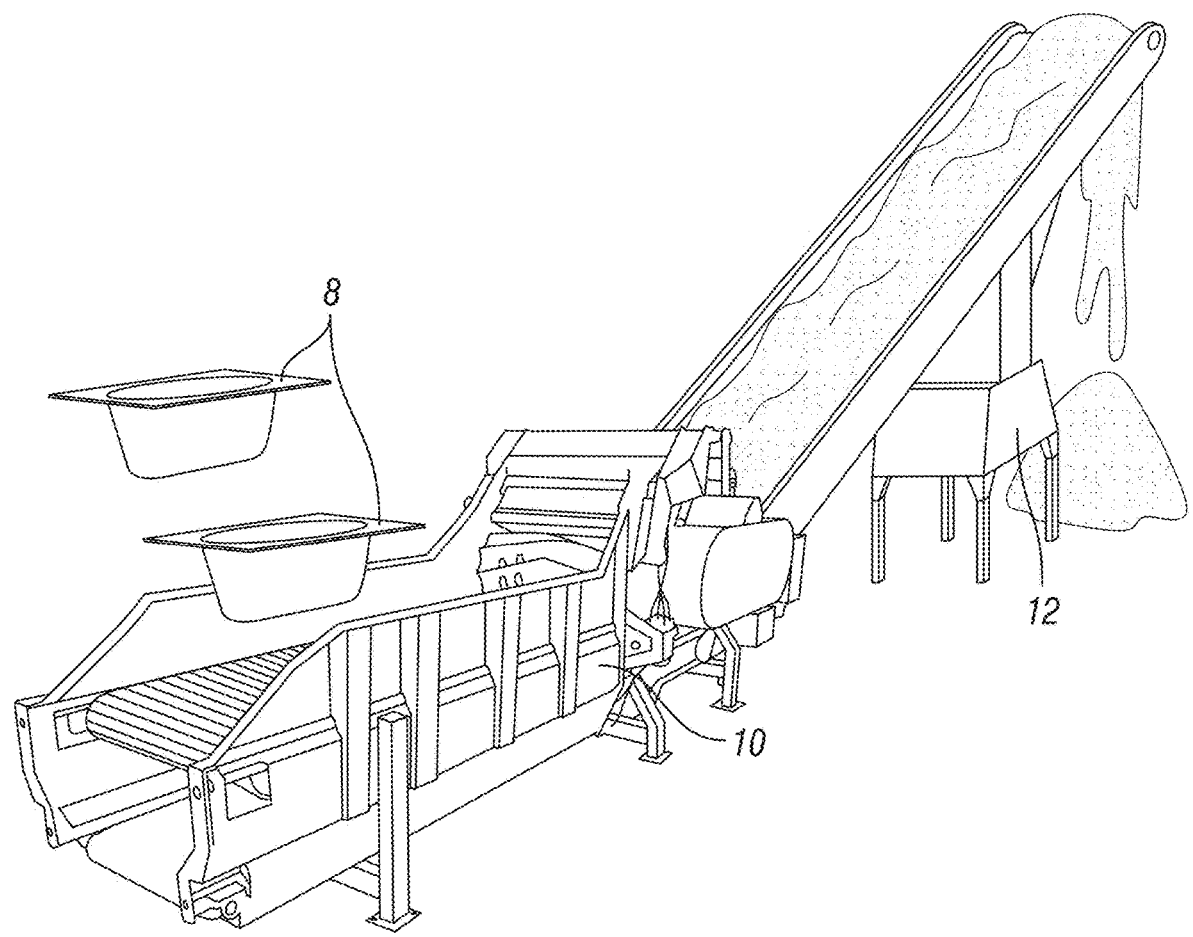
FIG. 4 is a perspective view of the various equipment used to complete the process of forming a concrete mixture.

The use of discarded fixtures and defective waste material to supplement normal aggregate such as mined limestone or granite allows for useful repurposing and recycling of defective waste material and discarded fixtures, conserves the natural deposits of aggregate that exist in nature, protects the environment by reducing the amount of pollution involved in mining activities, reduces the amount of bulky waste deposited into landfills which help them operational for longer, and reduces the environmental impacts associated with landfills.

The defective waste materials and discarded fixtures have a composition of 49.5 to 70 percent by weight of limestone, 20 percent or less by weight of fiberglass and much smaller quantities of titanium dioxide, calcium stearate, magnesium hydroxide, polyethylene, magnesium oxide and quartz. In particular, the waste material is comprised of about 49.5-70% by weight of limestone, less than 20% by weight of fiberglass, about 10.8-13.6% by weight of styrene, about 9.9% by weight of polyester resin, about 4.3-4.85% of titanium dioxide, less than 3% by weight of calcium stearate, about 1.5-3% by weight of magnesium hydroxide, about 1.96-2% by weight of polyethylene, about 0.3-1.5% by weight of polystyrene, less than 1.5% by weight of magnesium oxide, less than 1% by weight of tert-Butyl peroxybenzoate, and about 0.05-0.525% by weight of quartz. The fiberglass present in the waste material helps provide tensile strength to the various concrete products formed out of the waste material. The waste material 8 is washed and sorted and then loaded into a grinder 10 as shown in FIG. 4 whereby it is grinded to a diameter such that it passes through a 1¾" screen. This grinded waste material 1¾ inch or smaller is reserved for use in a concrete mix. Alternatively, the 1¾" waste material is then further fed into a hammer mill 12 having a ⅛" screen where it is pulverized into a granulated powder of a desired consistency. The processed waste material is then added to other ingredients to make a complete concrete mix. The composition of concrete in one embodiment would contain by weight 15.5% ordinary Portland cement, 40-60 percent ground waste material, 20 to 35% of natural aggregate, and 8.2% water. The ratio of water to Portland cement is around 0.53. Three alternate embodiments are located below in FIG. 1 and FIG. 2 and FIG. 3. FIG. 1 shows the composition containing larger pieces of waste material up to 1¾ inches for applications involving concrete applications mixed with a fine aggregate which is natural sand. FIG. 2 shows the composition containing waste material in granular powder form mixed with natural coarse aggregate larger pieces of waste material up to 1¾ inches for concrete applications. FIG. 3 shows the composition containing waste material in powder form for applications of using the composition of matter as a grout for filling small cracks in pre-existing concrete structures or for use in laying tile. The compositions in FIG. 1 and FIG. 2 are interchangeable when a concrete mixing plant or operation has either more sand or natural coarse aggregate on hand and thus allows for the formation of concrete when either natural sand or rock is not as available as the other. Some concrete products that can be made from this novel composition of matter concrete are various types and shapes of concrete pavers, decorative concrete rocks, decorative stone balls, protective pillars for parking, concrete manholes for sewage systems of various sizes and shapes decorative concrete to replace beach pebble concrete base, custom erosion control molds that are formed to conform with the land and filled with this recycled concrete, erosion control devices such as tetrapods that are used for beach erosion, bird baths, concrete sculptures for landscape use, concrete counter tops and many other concrete products.

Typically, a concrete mix is about 10 to 15 percent cement, 60 to 75 percent aggregate and 15 to 20 percent water. Entrained air in many concrete mixes may also take up another 5 to 8 percent. Normally, concrete contains up to 75% natural aggregate such as rock and sand, however, because the limestone/fiberglass waste material herein disclosed is mostly Calcium Carbonate (CaCO3) it is a suitable replacement for a portion of the natural aggregate such that it gives sufficient strength to serve its purpose for making the above-described concrete products. Soon after the aggregates, limestone/fiberglass waste material, water, and the cement are combined, the mixture starts to harden. All portland cements are hydraulic cements that set and harden through a chemical reaction with water called hydration. During this reaction, a node forms on the surface of each cement particle. The node grows and expands until it links up with nodes from other cement particles or adheres to adjacent aggregates as well as the limestone/fiberglass waste material. The grinding process of the limestone/fiberglass waste material creates surfaces on the material that are pitted grooved, gouged, scarred and abraded such that more surface area is created on the limestone/fiberglass waste material pieces that allows the cement to bind to more surface area on the waste material so as to create a stronger bond between the cement, waste material and concrete.

FIG. 5 shows a table whereby various amounts of natural coarse and fine aggregate are used in combination with waste material coarse and fine aggregates. The percentages shown therein are representative but not exclusive of the various concrete mixes that can used. Various different applications will dictate what percentages of natural and waste material aggregate can be used. Further, if natural aggregate is not available, then 100 percent waste material can be used to form a concrete mixture.

FIGS. 6-8 are tables that depict different concrete mixes. These concrete mixes are what are considered design mixes. Design mixes are concrete mixes that are based on weight as opposed to volume. Volume mixes are termed Nominal mixes and are normally used on jobsites where workers mix the concrete themselves in mixers. Design mixes are normally used in large scale factory production of various concrete products whereby the precision of the mix leads to varying desirable results for a particular concrete product. The mixes shown in FIGS. 6-8 show both coarse and fine aggregate percentages which can be either natural or waste material aggregate according to the availability of each type of aggregate or the potential desirability of using either natural or waste material aggregate for a desired end result and application. The mixes shown in FIGS. 6-8 can correspond to FIG. 5 where it shown representative percentages of natural aggregate and waste material aggregate.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

What is claimed is:

1. A composition of matter, comprising:
   40 to 75 percent by weight of a waste material whereby said waste material is comprised of 49.5-70% by weight of limestone, less than 20% by weight of fiberglass, 10.8-13.6% by weight of styrene, 9.9% by weight of polyester resin, 4.3-4.85% of titanium dioxide, less than 3% by weight of calcium stearate, 1.5-3% by weight of magnesium hydroxide, 1.96-2% by weight of polyethylene, 0.3-1.5% by weight of polystyrene, less than 1.5% by weight of magnesium oxide, less than 1% by weight of tert-Butyl peroxybenzoate, and 0.05-0.525% by weight of quartz;
   15 to 16 percent by weight of a portland cement;
   5-36 percent by weight of a natural fine aggregate;
   8-9% by weight of a water.

2. The composition of matter of claim 1 wherein the percent by weight of the waste material is in the range of 40-42% percent, the percentage by weight of the portland cement is 15-16% percent by weight, the natural coarse aggregate is 34-36% by weight and the percentage of water is 8-9% by weight.

3. The composition of claim 2 wherein the size of said waste material is one and three-quarter inches or less.

4. The composition of claim 2 wherein the size of said waste material is one eighth of an inch or less.

5. A composition of matter, comprising:
   40 to 75 percent by weight of a waste material whereby said waste material is comprised of 49.5-70% by weight of limestone, less than 20% by weight of fiberglass, 10.8-13.6% by weight of styrene, 9.9% by weight of polyester resin, 4.3-4.85% of titanium dioxide, less than 3% by weight of calcium stearate, 1.5-3% by weight of magnesium hydroxide, 1.96-2% by weight of polyethylene, 0.3-1.5% by weight of polystyrene, less than 1.5% by weight of magnesium oxide, less than 1% by weight of tert-Butyl peroxybenzoate, and 0.05-0.525% by weight of quartz;
   15 to 16 percent by weight of a portland cement;
   5-36 percent by weight of a natural fine aggregate;
   8-9% by weight of a water.

6. The composition of matter of claim 5 wherein the percent by weight of the waste material is in the range of 40-42% percent, the percentage by weight of the portland cement is 15-16% percent by weight, the natural fine aggregate is 34-36% by weight and the percentage of water is 8-9% by weight.

7. The composition of claim 6 wherein the size of said waste material is one and three/quarter inches or less.

8. The composition of claim 6 wherein the size of said waste material is one-eighth of an inch or less.

9. A method for repurposing a waste material into a functional product comprising the steps of:
   sourcing a waste material and moving it to a processing site whereby said waste material is comprised of 40 to 75 percent by weight of said waste material and whereby said waste material is comprised of 49.5-70% by weight of limestone, less than 20% by weight of fiberglass, 10.8-13.6% by weight of styrene, 9.9% by weight of polyester resin, 4.3-4.85% of titanium dioxide, less than 3% by weight of calcium stearate, 1.5-3% by weight of magnesium hydroxide, 1.96-2% by weight of polyethylene, 0.3-1.5% by weight of polystyrene, less than 1.5% by weight of magnesium oxide, less than 1% by weight of tert-Butyl peroxybenzoate, and 0.05-0.525% by weight of quartz;
   washing said waste material;
   grinding and/or pulverizing said waste material into pieces the size of one and three quarter inches or less;
   mixing with at least one concrete mixer said waste material with 15 to 16 percent by weight of portland cement,
   5-36 percent by weight of a natural aggregate and 8-9% by weight of water and pouring said mixture into various forms to create structurally rigid functional products.

10. The method of claim 9 wherein the mixing process to form a functional product is modified to wherein the percent by weight of the waste material used in the functional product is in the range of 40-42% percent, the percentage by weight of the portland cement is 15-16% percent by weight, the natural aggregate is 34-36% by weight and the percentage of water is 8-9% by weight.

11. A composition of matter, comprising:
    10 to 80 percent by weight of a waste material whereby said waste material is comprised of 49.5-70% by weight of limestone, less than 20% by weight of fiberglass, 10.8-13.6% by weight of styrene, 9.9% by weight of polyester resin, 4.3-4.85% of titanium dioxide, less than 3% by weight of calcium stearate, 1.5-3% by weight of magnesium hydroxide, 1.96-2% by weight of polyethylene, 0.3-1.5% by weight of polystyrene, less than 1.5% by weight of magnesium oxide, less than 1% by weight of tert-Butyl peroxybenzoate, and 0.05-0.525% by weight of quartz;
    11 to 18 percent by weight of a portland cement;
    7-9% by weight of a water; and
    whereby a natural coarse aggregate or a natural fine aggregate can be mixed with said 10 to 80 percent by weight of waste material and whereby the waste material can be either a coarse waste material or a fine waste material to achieve a desired concrete mix based on a particular application said concrete mix is intended for and whereby said coarse waste material size is 1¾ inches and said fine waste material is ⅛ inches or less.

12. The composition of matter of claim 11 comprising 17 to 18 percent of portland cement, 51 to 52 percent by weight of natural coarse aggregate, 23 to 24 percent by weight of natural fine aggregate and 7 to 7.5 percent by weight of water and whereby said coarse and fine waste material can be used interchangeably with said natural coarse aggregate and natural fine aggregate.

13. The composition of matter of claim 11 comprising 14 to 15 percent of portland cement, 54 to 54.5 percent by weight of natural coarse aggregate, 24 to 25 percent by weight of natural fine aggregate and 7 to 7.5 percent by weight of water and whereby said coarse and fine waste material can be used interchangeably with said natural coarse aggregate and natural fine aggregate.

14. The composition of matter of claim 13 comprising 11 to 12 percent of portland cement, 55 to 56 percent by weight of natural coarse aggregate, 25 to 26 percent by weight of natural fine aggregate and 7 to 7.5 percent by weight of water and whereby said coarse and fine waste material coarse and fine aggregate can be used interchangeably with said natural coarse aggregate and natural fine aggregate.

\* \* \* \* \*